Oct. 5, 1937. C. WEIBEZAHN ET AL Re. 20,527
PROCESS OF PREPARING ACETYLENE
Original Filed Feb. 8, 1929
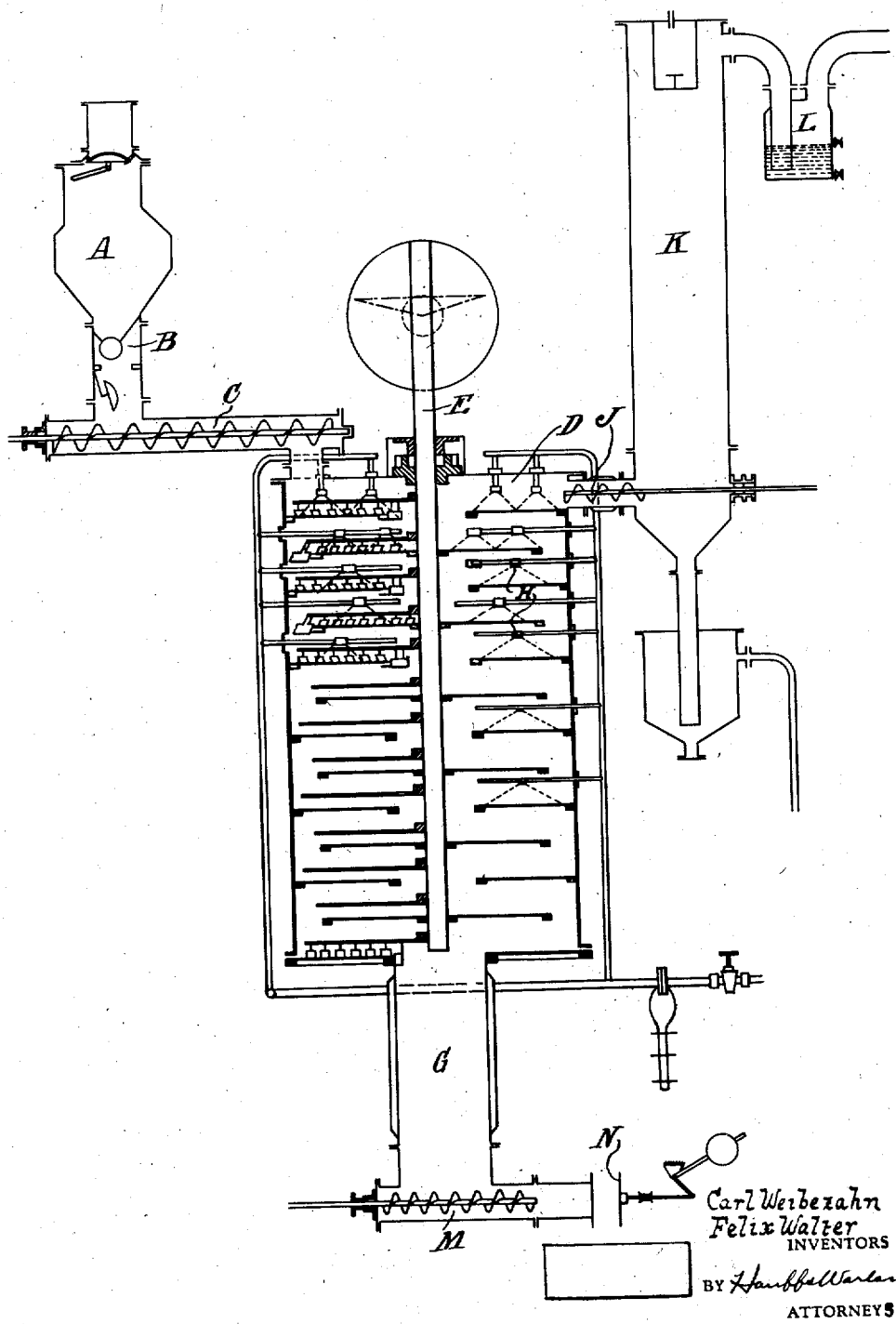
Carl Weibezahn
Felix Walter
INVENTORS
BY Hauff & Warland
ATTORNEYS Reissued Oct. 5, 1937

Re. 20,527

UNITED STATES PATENT OFFICE 20,527

PROCESS OF PREPARING ACETYLENE

Carl Weibezahn and Felix Walter, Knapsack, near Cologne-on-the-Rhine, Germany, assignors to Aktiengesellschaft für Stickstoffdunger, Cologne-on-the-Rhine, Germany, a corporation Original No. 1,916,592, dated July 4, 1933, Serial No. 338,433, February 8, 1929. Application for reissue June 29, 1935, Serial No. 29,106. In Germany February 14, 1928

13 Claims. (Cl. 48—216)

The present invention relates to a process of preparing acetylene.

It is generally known that in the manufacture of acetylene from calcium carbide the removal of heat evolved during the process is of great importance, because high temperature causes loss of material and danger in working; for this reason the calcium carbide is introduced into 7–10 times its weight of water, and this mode of procedure is officially prescribed for industrial carbide gas producers. Apart from certain losses caused by the use of such a relatively large quantity of water, the said procedure has the special disadvantage that the calcium hydroxide which is formed is obtained in a state of mud, which renders its industrial utilization difficult; in certain cases the hydroxide even constitutes a cumbersome waste product. Numerous attempts have been made to reduce the proportion of water to be used in producing gas from the calcium carbide without loss of material or danger in working. It has been proposed to decompose the calcium carbide with a limited quantity of water in presence of calcium hydroxide powder, the calcium carbide being brought into contact with the calcium hydroxide while introducing such a quantity of water as will prevent an excessive and therefore injurious rise of temperature. However, attempts in this direction have not given the desired result because it has not been possible to absorb the heat evolved during the decomposition of the calcium carbide sufficiently to avoid a dangerous rise of temperature during the whole process.

The present invention relates to a simple method by which the problem in question may be solved. According to this method there is applied to the calcium carbide, while it is kept continuously in motion, so much water in a finely divided form, that there is present in addition to the amount theoretically required for producing the gas a further quantity as is sufficient to absorb the heat evolved without a dangerous rise of temperature. During the process care must be taken that, while the water is applied, the calcium carbide to be decomposed is simultaneously kept in motion, so that not only is the surface presented to the water continually changed and the calcium hydroxide produced kept uniformly mixed with the remaining calcium carbide but also the temperature is kept uniform throughout the mass by the movement. In this manner it is possible to absorb the heat, as it is produced, by converting water into steam at a temperature not exceeding 100° C., the steam escaping along with the acetylene evolved. Thus, a complete yield of acetylene can be produced from the calcium carbide without any danger, while there is simultaneously obtained a substantially dry calcium hydroxide.

In working the new process, it is not absolutely necessary to add the water in a finely divided form. For carrying out the process according to the invention, any one of the usual apparatus may be used which permits a continuous and thorough mixing of the calcium carbide and at the same time allows introduction of the water in a suitable form and removal of the acetylene and the calcium hydroxide produced. However, a generator, as shown in diagrammatic vertical section in the accompanying drawing, has proved to be very suitable. Such apparatus is claimed in our copending application Serial No. 484,112 (now Patent 1,947,120, dated February 13, 1934).

The calcium carbide is conveyed from the storage vessel A to the generator D by means of a delivering device B and the screw conveyer C. In this generator is a number of fixed plates F arranged in steps, one above the other. By means of stirring arms carried by a vertical shaft E in the generator, the calcium carbide is caused to pass from plate to plate. The water is uniformly distributed over the calcium carbide by means of the nozzles H mounted above the plates. By the action of the stirring arms the mass is thoroughly mixed and thus everywhere a uniform temperature is obtained which rises at the most to 90° C. The temperature of the escaping acetylene, which is admixed with water vapor, should be controlled by thermometers placed in the uppermost, middle and lowermost part of the apparatus. The acetylene produced leaves the generator at J, where there is an endless screw device which prevents choking of the outlet pipe by any lime that may be carried along with the acetylene. The acetylene then passes through the cooler K and the washer L to the place of use. The substantially dry calcium hydroxide which falls into the chutes G is continuously removed by the conveyer M against the pressure of the weighted door N.

Accordingly, in the operation of this process the gaseous products produced flow countercurrent to, and in intimate contact with, all other constituents in the reaction chamber; that is to say, the calcium carbide and water as well as the resulting calcium hydroxide continuously advance through the generator in intimate contact with, and in a direction which is countercurrent to the travel of, the resulting acetylene and water vapor.

We claim:

1. The process for continuously producing acetylene and substantially dry calcium hydroxide from calcium carbide which comprises moistening a moving body comprising calcium carbide with water at a plurality of points along its path of movement while continuously agitating the constituents of the moving body, the amount of water employed being only that necessary to effect a conversion of the calcium carbide into acetylene and calcium hydroxide and a reduction of the heat of the reaction to below 100° C. by evaporation of a part of said water.

2. A process as in claim 1 wherein the moving body is given a step by step advance and water is sprayed thereon at each step.

3. The process for continuously producing acetylene and substantially dry calcium hydroxide from calcium carbide which comprises directly contacting a moving body consisting initially of calcium carbide with water at a plurality of points along its path of movement while continuously agitating the constituents of the moving body, the amount of water employed being only that necessary to effect a conversion of the calcium carbide into acetylene and calcium hydroxide and a reduction of the heat of reaction to below 100° C. by evaporation of a part of said water.

4. The process for continuously producing acetylene and substantially dry calcium hydroxide from calcium carbide which comprises directly contacting a moving body consisting initially of calcium carbide with water along its path of movement while continuously agitating the moving body, the amount of water employed being not more than that necessary to effect a conversion of the calcium carbide into acetylene and calcium hydroxide and a reduction of the heat of reaction to below 100° C. by evaporation of a part of said water.

5. The process for continuously producing acetylene and substantially dry calcium hydroxide from calcium carbide, which comprises directly contacting a moving body consisting initially of calcium carbide with water along its path of movement while continuously agitating the moving body, the amount of water employed being not more than that necessary to effect a conversion of the calcium carbide into acetylene and calcium hydroxide and a reduction of the heat of reaction to below 100° C. by evaporation of a part of said water, and continuously removing the substantially dry calcium hydroxide formed by said reaction.

6. A process for continuously producing acetylene and substantially dry calcium hydroxide, which comprises feeding calcium carbide into a generating zone; adding water directly to the material in the generating zone, the amount of water so added being substantially the quantity of water necessary to react with the calcium carbide and effect a conversion of the latter into acetylene and calcium hydroxide plus a quantity of water adapted to be vaporized and reduce the heat of such reaction so as to avoid a dangerous rise of temperature in said generating zone; and, during the addition of such water, continuously mixing the calcium carbide and the calcium hydroxide, so that the surface presented to the water is continually changed and the temperature throughout the material is kept substantially uniform.

7. A process for continuously producing acetylene and substantially dry calcium hydroxide, which comprises continuously advancing a body of material, initially consisting of calcium carbide, through a generating chamber; continuously adding water to said material while the same is advancing, the amount of water employed being sufficient but not more than the quantity of water required to completely react the calcium carbide and produce acetylene and calcium hydroxide plus the quantity of water required to absorb sufficient heat evolved by such reaction to avoid a dangerous rise of temperature within said chamber; and, during the advance of the material and the addition of the water, continuously mixing the material so that the surface thereof presented to the water is continually changed and the temperature throughout the material is kept substantially uniform.

8. A process for continuously producing acetylene and substantially dry calcium hydroxide, which comprises continuously feeding calcium carbide into and advancing the same within a generating chamber; continuously spraying water directly onto said calcium carbide at a plurality of points within said chamber while said calcium carbide is advancing, the amount of water so sprayed being sufficient but not more than the quantity of water required to completely react the calcium carbide and produce acetylene and calcium hydroxide plus the quantity of water required by vaporization thereof to absorb sufficient heat evolved by such reaction to avoid a dangerous rise of temperature within said chamber; and, during the addition of the water and the advance of the calcium carbide and the resulting calcium hydroxide, continuously mixing the remaining calcium carbide with the water and the resulting calcium hydroxide, so that the surface of such material presented to the inflowing water is continually changed and the temperature throughout the material is kept substantially uniform.

9. A process for continuously and simultaneously producing acetylene and substantially dry calcium hydroxide, which comprises continuously feeding calcium carbide into a generating chamber; continuously applying water to the calcium carbide in said chamber, the amount of water so applied being sufficient but not more than the quantity of water required to completely react said calcium carbide and produce acetylene and calcium hydroxide plus the quantity of water required to absorb sufficient heat evolved by such reaction to avoid a dangerous rise of temperature within said chamber; while said water is being so applied, continuously mixing the resulting mass of calcium carbide, calcium hydroxide and water, to continually change the surface of the mass that is presented to the water so applied, whereby the temperature throughout said mass is kept substantially uniform and a portion of said water is converted into water vapor; and removing water vapor along with acetylene from said generating chamber.

10. A process for continuously and simultaneously producing acetylene and substantially dry calcium hydroxide, which comprises continuously feeding calcium carbide into a generating chamber; continuously applying water directly to the calcium carbide in said chamber and to the calcium hydroxide resulting from the reaction of such water and calcium carbide, the amount of water so applied being sufficient but not more than the quantity of water required to completely react said calcium carbide and produce acetylene and calcium hydroxide plus the quantity of water required to absorb sufficient heat evolved by said reaction to avoid a dangerous rise of temperature within said chamber; and, while said water is being so applied, continuously advancing the resulting mass of calcium carbide, calcium hydroxide and water and continuously mixing said mass to continually change the surface of the mass presented to the inflowing water, whereby the temperature throughout said mass is kept substantially uniform and a portion of said water is converted into steam; and removing steam from said generating chamber with the acetylene produced in said chamber.

11. A process for continuously and simultaneously producing acetylene and substantially dry calcium hydroxide, which comprises continuously feeding calcium carbide into a generating chamber; continuously applying water directly to the calcium carbide in said chamber, the amount of water so applied being sufficient but not more than the quantity of water required to completely react said calcium carbide and thereby produce acetylene and calcium hydroxide plus the quantity of water required to absorb sufficient heat evolved by such reaction to avoid a dangerous rise of temperature within said chamber; while said water is being applied, continuously advancing within said chamber the resulting mass of calcium carbide, calcium hydroxide and water and continuously mixing said mass to continually change the surface of said mass that is presented to the water so applied, whereby the temperature throughout said mass is kept substantially uniform and a portion of said water is converted into steam; and removing acetylene and steam simultaneously from said generating chamber in a direction that is countercurrent to the direction of advance of said mass within said chamber.

12. A process for continuously and simultaneously producing acetylene and substantially dry calcium hydroxide as claimed in claim 11, wherein said resulting mass of calcium carbide, calcium hydroxide and water is continuously advanced downwardly within said chamber, and acetylene and steam simultaneously flow upwardly within said chamber in a direction countercurrent to the direction of advance of said mass.

13. A process for continuously and simultaneously producing acetylene and substantially dry calcium hydroxide as claimed in claim 11, wherein said resulting mass of calcium carbide, calcium hydroxide and water is continuously advanced downwardly within said chamber, acetylene and steam simultaneously flow upwardly within said chamber in a direction countercurrent to the direction of advance of said mass, and the calcium hydroxide so produced is removed from the bottom end of said chamber.

CARL WEIBEZAHN.
FELIX WALTER.